May 26, 1964 S. H. HAGE 3,134,112
WINDSHIELD LIFT MECHANISM
Filed April 4, 1962 2 Sheets-Sheet 1

INVENTOR.
STANISLAS H. HAGE
BY
Wheeler, Wheeler & Wheeler
ATTORNEYS.

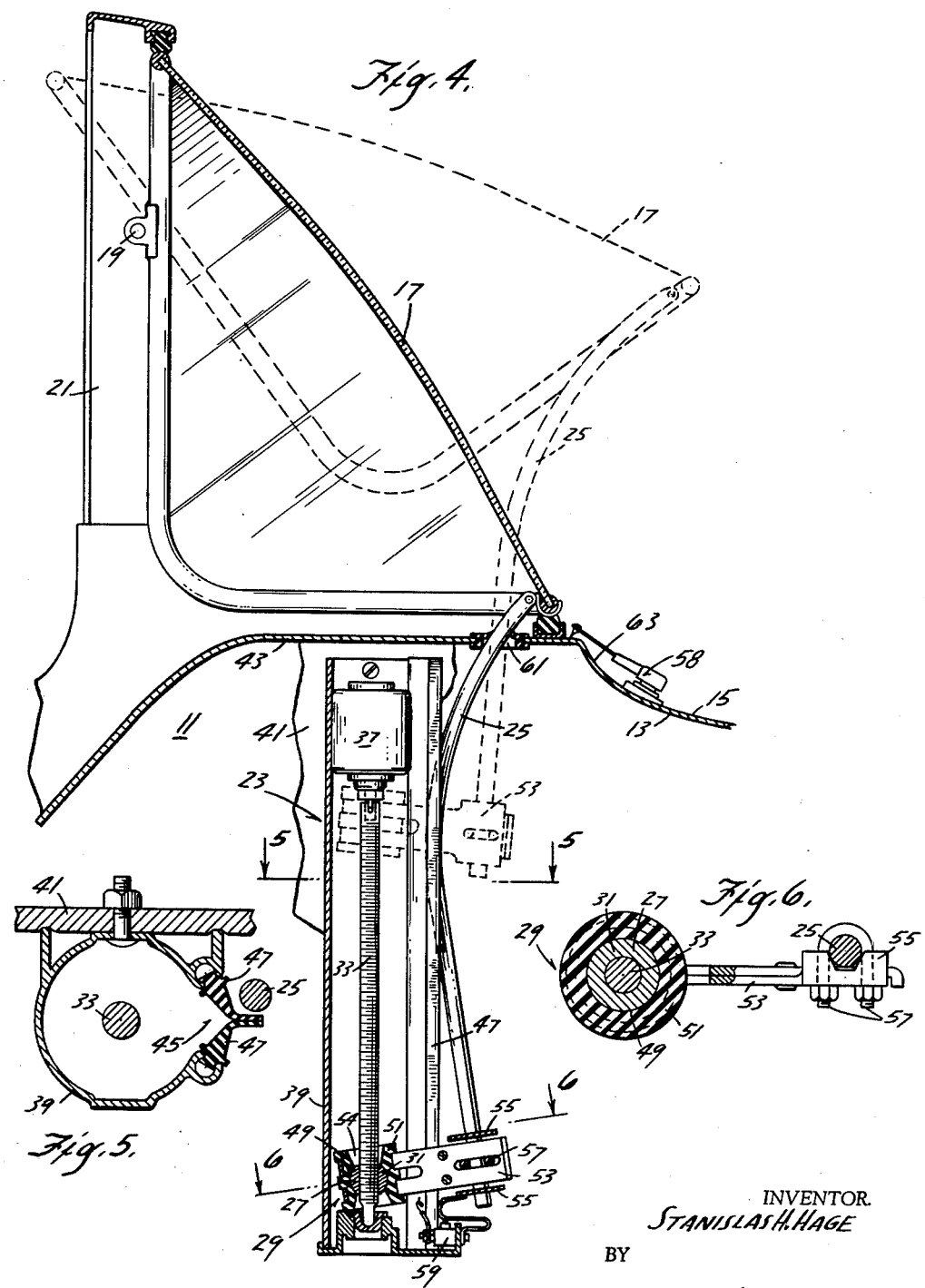

United States Patent Office 3,134,112
Patented May 26, 1964

3,134,112
WINDSHIELD LIFT MECHANISM
Stanislas H. Hage, Lake Bluff, Ill., assignor to Outboard Marine Corporation, Waukegan, Ill., a corporation of Delaware
Filed Apr. 4, 1962, Ser. No. 185,003
19 Claims. (Cl. 9—1)

The invention relates to boats or other vehicles including tiltable windshields and to mechanisms for tilting such windshields. In general, the invention also relates to mechanisms for actuating a link operable to effect movement through a predetermined path of an associated device or member.

The invention provides a mechanism for tilting a pivotally mounted windshield relative to a closed position by a linkage including an element or member which is linearly movable along a fixed path and an actuating link or rod which is connected to the windshield and displaceable by the linearly movable member to effect opening and closing of the windshield. The linkage is readily adaptable for automatic powering and serves to prevent transmission of shock loads to the windshield and to afford universal movement of the windshield actuating link relative to the linearly movable member, thereby to accommodate swinging of the windshield about its pivotal mounting. In the preferred embodiment, the linkage includes a motorized lead screw threadedly engaged with a nut which is connected to the actuating link or rod by a resilient coupling affording the before-mentioned universal movement and shock absorbing features. In addition, the resilient coupling co-operates with other means to effect tilting of the windshield by restraining rotation of the nut with the lead screw except when the actuating link is not under load, as when the windshield is in its closed position and the lead screw is rotated in the windshield closing direction. In the disclosed embodiment, the linkage also serves to prevent operation of an electrically powered windshield wiper.

Other features of the invention reside in the formation and mounting of the windshield, coupled with the configuration of the boat hull on the vehicle body immediately forwardly of the windshield, whereby the windshield may be partially opened through a limited range to afford ventilation of the cockpit without subjecting the occupants thereof to the discomfort of a high velocity stream passing through the boat at a level corresponding generally to the open area between the windshield and the adjacent forward deck of the boat. More particularly, the preferred construction includes an upwardly curved forward deck portion immediately in front of the lower margin of the windshield, which lower margin, when the windshield is partially open, extends upwardly in generally parallel relation to a line extending tangentially from the upwardly curving forward deck portion. As a result, such air as enters under the windshield, when in a partially opened condition, tends to be directed upwardly along the rearward side of the windshield and then rearwardly over the heads of the occupants. This stream of air effects a gentle ventilating action and avoids the before-mentioned discomfort.

The invention has for one principal object the provision of an improved windshield installation for a boat or other vehicle. Another principal object is the provision of an improved actuating mechanism. Other objects and advantages of the invention will become known by reference to the following description and the accompanying drawings in which:

FIGURE 4 is a fragmentary, enlarged elevational view, partially broken away and in section, of the windshield and its actuating mechanism;

FIGURE 5 is an enlarged, sectional view taken generally along line 5—5 of FIGURE 4; and FIGURE 6 is an enlarged, sectional view taken generally along line 6—6 of FIGURE 4.

Figure 1:
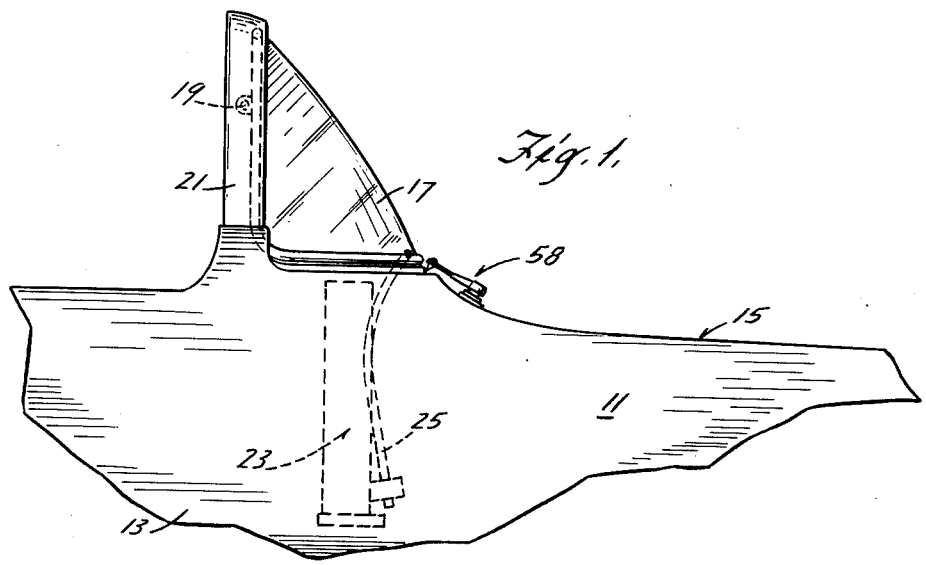
FIGURE 1 is a fragmentary side elevational view of a boat incorporating a windshield installation, including an actuating mechanism, embodying various of the features of the invention, which view shows the windshield in closed position.
Figure 2:
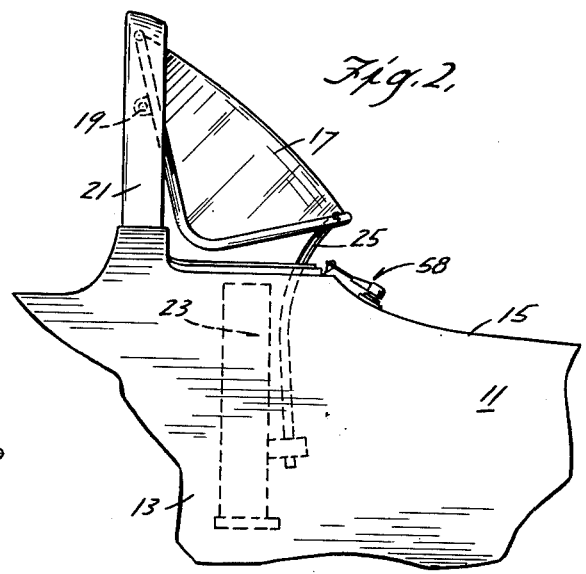
FIGURE 2 is a view similar to FIGURE 1 showing the windshield in partially open position.
Figure 3:
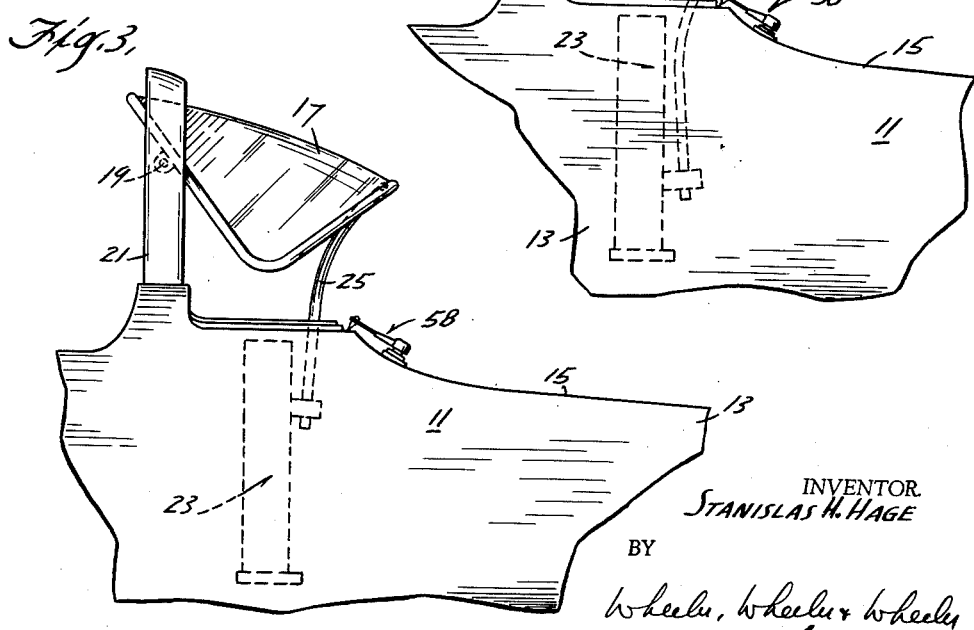
FIGURE 3 is a view similar to FIGURES 1 and 2 showing the windshield in its fully open position.

The boat 11 illustrated in the drawings is representative of a wide class of vehicles including, for example, cars and trucks, and incorporates a windshield installation affording both the motorized control and the ventilating features of the invention. Specifically, the boat 11 includes, as seen in FIGURES 1 through 3, a hull 13 incorporating a forwardly extending, upper deck 15 terminating at the base of a windshield 17. The windshield 17 is mounted, intermediate its upper and lower edges, for tiltable movement relative to a closed position, by a pair of pivot means 19 mounted on supporting posts 21 extending from the hull 13. The windshield 17 is tiltable about the pivotal mounting by an actuating mechanism 23 including an elongated actuating link or rod 25 which is pivotally connected, at one end, to the lower edge of the windshield 17.

The actuating mechanism 23, as already pointed out, serves to afford opening and closing of the windshield 17, while protecting the windshield against shock loads, such as occur incident to passing of the boat through a crossing wave. In addition to its incorporation in combination with a windshield in a boat or other vehicle, the disclosed actuating mechanism 23 is usable in a wide variety of situations, particularly where a part of the actuating link travels through a predetermined curvilinear path.

In addition to the actuating rod 25, the actuating mechanism 23 includes, as shown best in FIGURE 4, a displaceable element or member 27 which is movable along a fixed linear path and which is connected to the actuating rod 25 by a coupling 29 to effect opening and closing of the windshield 17. More particularly, in the disclosed embodiment, the displaceable member 27 is a nut 31 which is threadedly engaged on a lead screw 33 for displacement axially of the lead screw. While the lead screw 33 can be manually operated, it is preferably driven through a combination speed reducer and reversible electric motor 37. The lead screw 33 and the combination speed reducer and motor 37 are fixedly contained, except for rotational movement of the lead screw, in a generally upright housing 39 secured to a vertical frame member 41 of the hull 13, which frame member is located in the general area beneath and forwardly of the dashboard 43, which dashboard can be considered a rearward extension of the upper deck 15.

The housing 39 generally takes the form of a cylinder having therein an elongated slot 45 which is closable by an elongated pair of lips 47 of rubber or other suitable resilient material. As will be seen, the parallel edges of the slot 45 cooperate with the coupling 29 to prevent rotation of the coupling 29 with the lead screw 33. The coupling 29 also functions to displace the connected part of the actuating rod 25 in accordance with linear displacement of the nut 31 to provide a universal connection between the actuating rod 25 and the nut 31 about a pair of axes extending at right angles to each other and to the lead screw axis, thereby permitting tilting of the actuating rod 25 to accommodate movement of its upper end through a fixed path determined by pivotal movement of the windshield 17, to permit rotation of the nut 31 and the lead screw 33 in the absence of a load directed axially of the lead screw, and to absorb shock loads transmitted to the coupling 29.

In the disclosed preferred embodiment, the coupling 29 is provided by fabricating the nut 31 with a spherical outer surface, i.e., by using a ball nut, and by seating the nut in a generally spherical socket 49 in a body 51 of resilient material, such as rubber. The socket 49 is carried by a bracket or strap 53 suitably fixed to the lower end of the actuating rod 25, as by a vice member 55 and a U shaped bolted connection 57. The socket body 51 is truncated at diametrically opposite ends and communicates with opposed concave openings 54 permitting passage of the lead screw 33.

Any load transmitted from the actuating rod 25, in a direction axially of the lead screw 33, as for instance, when the windshield is in an open position, serves to effect gripping by the socket 49 of the ball nut 31 to prevent rotation therebetween in a plane generally perpendicular to the lead screw 33. Accordingly, the rod is generally a two-force member, with the line of force acting generally along a line intersecting the pivotal connection of the rod 25 with the windshield 17 and the center of the socket 49, and as the housing 39 is disposed so that the angle between such line of force and the lead screw axis is a relatively small acute angle, any load carried by the rod 25 will have a substantial component acting axially of the lead screw 33 to prevent rotation of the ball nut 31 relative to the socket 49. As such other loads as may be transmitted through the socket 49 to the nut 31 are minor compared to the axial load, rotation of the rod 25 about axes perpendicular to the lead screw 33 is not prevented.

As loading of the socket 49 by the rod 25 prevents rotation of the ball nut 31 relative to the socket 49, rotation of the coupling 29 with the ball nut 31 is restrained in response to rotation of the lead screw, and axial advancement of the nut is obtained, by interfering engagement of the bracket 53 with the flexible lips 47 supported along the edges of the slot 45.

Because gripping of the ball nut 31 by the socket 49 to cause linear displacement of the socket 49 along the lead screw 33, in response to rotation of the lead screw, occurs only under loading of the socket 49 axially of the lead screw 33, the socket also serves as a clutch disconnecting the ball nut 31 from the rod 25 in the absence of a load transmitted through the coupling 29 axially of the lead screw, as for instance, during closure of the windshield 17 when the windshield contacts an object preventing full closure. Under such circumstances, the weight of the windshield 17 is carried through the interfering object, and the ball nut 31 is permitted to rotate with the lead screw 33 relative to the socket 49, thereby unloading the motor.

This feature is utilized to unload the motor when the windshield is closed. Specifically, the housing 39 is fabricated to be engaged by the socket 49, as seen in FIGURE 4, when the windshield is closed so as to relieve any load transmitted to the ball nut 31 from the socket 49, thereby permitting free rotation of the ball nut relative to the socket. When the motor is subsequently reversely actuated to open the windshield, initial inertia of the ball nut 31 against rotation, coupled with frictional resistance to rotation relative to the socket, is sufficient to cause such initial displacement of the ball nut 31 axially of the lead screw 33 as will load the socket 49 relative to the ball nut 31 so as to restrain rotation of the ball nut relative to the socket 41, and thereby consequently cause lifting of the windshield 17 about its pivotal mounting in response to continued rotation of the lead screw.

If desired, movement of the coupling 29 can be utilized to prevent operation of an electrically powered windshield wiper 58 when the windshield 17 is open. Thus, in the disclosed construction, a normally open microswitch 59, controlling operation of the wiper, is mounted on the housing 39 in position for closure by the vice member 55 of the coupling 29, only when the windshield 17 is closed, thereby allowing operation of the wiper. If desired, a normally closed microswitch (not shown) can also be employed in association with the motor to prevent rotation thereof in the windshield closing direction after the windshield is closed, such switch being normally closed and being mounted on the housing in position to be opened by the coupling 29 when the windshield is closed.

The resilient characteristics of the socket body 51 also provide a cushion for absorbing shocks, thereby preventing transmission to the windshield of shocks occurring, as for instance, incident to spanking of the boat hull against crossing waves.

Preferably, the actuating rod 25 is curved to permit passage through a relatively small opening 61 in the top of the dashboard 43, and to limit the angle through which the rod 25 shifts in a vertical plane incident to movement of the windshield 17 from its fully closed to its fully open position. Thus, when the windshield is closed, the bracket 53 is disposed, relative the lead screw 33 at an upwardly and forwardly inclined disposition. When the windshield 17 is fully opened, the bracket 53 is disposed at a forwardly and downwardly inclined disposition relative to the lead screw 33. Midway between the fully open and closed positions of the windshield 17, the bracket 53 passes through a position at a right angle to the lead screw.

The ventilation feature of the disclosed construction involves directing the air stream entering the cockpit, when the windshield 17 is partially open, through an upwardly curving path over the head of the occupants. This is accomplished by forming the area of the upper deck 15 immediately forwardly of the windshield 17 with an upwardly curving portion 63, and by fabricating the windshield 17 with a slight rearwardly concave cross section so that, when partially opened, the lower margin of the windshield is disposed forwardly of its closed position and in generally parallel relation to a line of tangency extending from the upper edge of the curved portion 63. Consequently, when the windshield is partially opened, the incoming air stream is initially directed upwardly by the curving portion 63 of the upper deck 15, flows along the rear windshield surface, thereby being shielded, and then flows rearwardly above the heads of the occupants in the cockpit.

Various of the features of the invention are set forth in the following claims.

What is claimed is:

1. The combination of a boat hull, a windshield, means on said boat hull for pivotally mounting said windshield for movement between an open position and a closed position, an actuating link pivotally connected to said windshield at a point spaced from said pivotal mounting means, an element displaceable linearly along a fixed path, and
    resilient means for pivotally connecting said link to said element, whereby said windshield is swingable between said open and closed positions incident to displacement of said element.

2. A combination in accordance with claim 1 wherein said connecting means includes means providing pivotal movement of said link about an axis disposed at a right angle to the direction of movement of said element to accommodate movement of said windshield.

3. A combination in accordance with claim 2 wherein said element constitutes a nut, and wherein said combination includes a lead screw threadedly engaged with said nut, and
    means preventing rotation of said nut incident to rotation of said lead screw, whereby said nut is caused to move axially of said lead screw incident to rotation thereof.

4. The combination of a boat hull, a windshield, means on said boat hull for pivotally mounting said windshield for movement between an open position and a closed position, an actuating link pivotally connected to said windshield at a point spaced from said pivotal mounting means, a nut having a spherical outer surface, a lead screw rotatably mounted on said boat hull and threadedly engaged with said nut, means preventing rotation of said nut incident to rotation of said lead screw, and resilient means for pivotally connecting said link to said nut including means providing pivotal movement of said link about an axis disposed at a right angle to the direction of movement of said nut to accommodate movement of said windshield, said resilient connecting means comprising a resilient body fixed to said link and having a spherical socket in engagement with said spherical outer surface of said nut.

5. A combination in accordance with claim 4 wherein said resilient connecting means serves to prevent rotation of said nut relative to said socket about the axis of said lead screw incident to transmission of load between said socket and said nut axially of said lead screw.

6. A combination in accordance with claim 5 including electric motor means for rotating said lead screw, and means for supporting said windshield independently of said socket when said windshield is in its closed position, thereby permitting free rotation of said nut relative to said socket in the direction of rotation which is effective to locate said windshield in its closed position.

7. A combination in accordance with claim 6 wherein said windshield is mounted intermediate its upper and lower edges, and said link is connected to said windshield at its lower edge.

8. A combination in accordance with claim 7 wherein said boat hull includes
   a forward deck, and
   a dashboard extending rearwardly from said forward deck,
said lead screw is located below the level of said dashboard,
said dashboard includes an aperture therein of slightly larger size than the transverse cross section of said link, and
said link is curved and passes through said aperture incident to opening and closing movement of said windshield.

9. In combination with a boat hull, a windshield, means on said boat hull for pivotally mounting said windshield for movement between an open position and a closed position, an actuating link pivotally connected to said windshield at a point spaced from said pivotal mounting means, an element displaceable linearly, means for defining a fixed path upon which said element is displaceable, means for resiliently connecting said link to said element for swinging said windshield between said open and closed positions incident to displacement of said element,
an electrically operated windshield wiper mounted on said hull, and
a normally open electrical switch electrically connected to said wiper and mounted on said hull in position to be closed incident to movement of said windshield to its closed position.

10. A link actuating mechanism comprising
a movable element selectively displaceable along a fixed linear path,
a link,
means guiding said link for movement of a preselected part thereof along a predetermined arcuate path, and
resilient means for pivotally connecting said link, at a point spaced from said preselected part, with said element, thereby providing for pivotal movement of said link relative to said element about an axis disposed at a right angle to the direction of linear movement of said element and for absorption of shock loads transmitted to said connecting means.

11. A link actuating mechanism comprising a moveable element selectively displaceable along a fixed linear path, a link, means guiding said link for movement of a preselected part thereof along a predetermined path, and resilient means for pivotally connecting said link, at a point spaced from all preselected part with said element, thereby providing for pivotal movement of said link relative to said element about an axis disposed at a right angle to the direction of linear movement of said element and for absorption of shock loads transmitted to said connecting means, said element constituting a nut having a spherical outer surface, and said resilient connecting means comprising
    a resilient body fixed to said link and having a spherical socket in engagement with said spherical outer surface of said nut.

12. A mechanism in accordance with claim 11 wherein said resilient connecting means serves to prevent rotation of said nut relative to said socket about the axis of said lead screw incident to transmission of a load between said socket and said nut axially of said lead screw.

13. A mechanism in accordance with claim 12 including
electric motor means for rotating said lead screw, and
means for supporting loads transmitted by said link axially of said lead screw independently of said socket when said link is at one end of its predetermined path, thereby permitting free rotation of said nut in the direction of rotation which is effective to position said link part at said one end of its predetermined path.

14. The combination in a vehicle body of
a forwardly extending deck having an upwardly curved rearward portion,
spaced support means disposed above said forwardly extending deck,
means for pivotally mounting a windshield on said support means, and
a windshield carried by said mounting means for movement from a closed position with a portion of its lower margin extending from adjacent the rearward edge of said upwardly curved deck portion in generally tangential relation to an adjacent part of said upwardly curved deck portion to open position shielding air directed tangentially upwardly from said upwardly curved deck portion and behind said windshield.

15. A combination in accordance with claim 14 wherein said lower margin portion of said windshield extends, when in a partially open position, upwardly from a position located in forwardly and upwardly spaced relation to the rearward edge of said adjacent part of said upwardly curved deck portion and in generally parallel relation to a line extending tangentially with respect to said adjacent part of said upwardly curved deck portion from the rearward edge thereof so as to shield the air flow directed upwardly from said curved rearward deck portion.

16. A combination in accordance with claim 15 wherein said windshield is rearwardly concave in vertical cross section.

17. The combination of a boat hull, a windshield, means on said boat hull for pivotally mounting said windshield for movement between an open position and a closed position, an actuating link pivotally connected to said windshield at a point spaced from said pivotal mounting means, an element displaceable linearly along a fixed path, and resilient means for pivotally connecting said link to said element, whereby said windshield is swingable between said open and closed positions incident to displacement of said element, said boat hull including a forward deck having an upwardly curved rearward portion terminating adjacent to a portion of the lower margin of said windshield, and said windshield includes a lower margin portion extending, when said windshield is closed, generally tangentially from said upwardly curved rearward portion of said forward deck.

18. A combination in accordance with claim 17 wherein said lower margin portion of said windshield extends, when in a partially open position, upwardly and rearwardly from a location forwardly of the rearward edge of said upwardly curved rearward deck portion.

19. The combination of a boat hull, a windshield, means on said boat hull for pivotally mounting said windshield for movement between an open position and a closed position, an electrically operated windshield wiper mounted on said hull, and a normally open electrical switch electrically united to said wiper and mounted on said hull in position to be closed in response to movement of said windshield to its closed position.

References Cited in the file of this patent

UNITED STATES PATENTS

| | | |
|---|---|---|
| 1,506,697 | Warman | Aug. 26, 1924 |
| 1,682,185 | Potter | Aug. 28, 1928 |
| 2,576,816 | Wahlberg | Nov. 27, 1951 |
| 2,945,691 | Swift et al. | July 19, 1960 |
| 3,021,535 | Dorst | Feb. 20, 1962 |